June 10, 1947.    W. B. GREGG    2,422,092
TRACTION SHOE
Filed Feb. 21, 1947
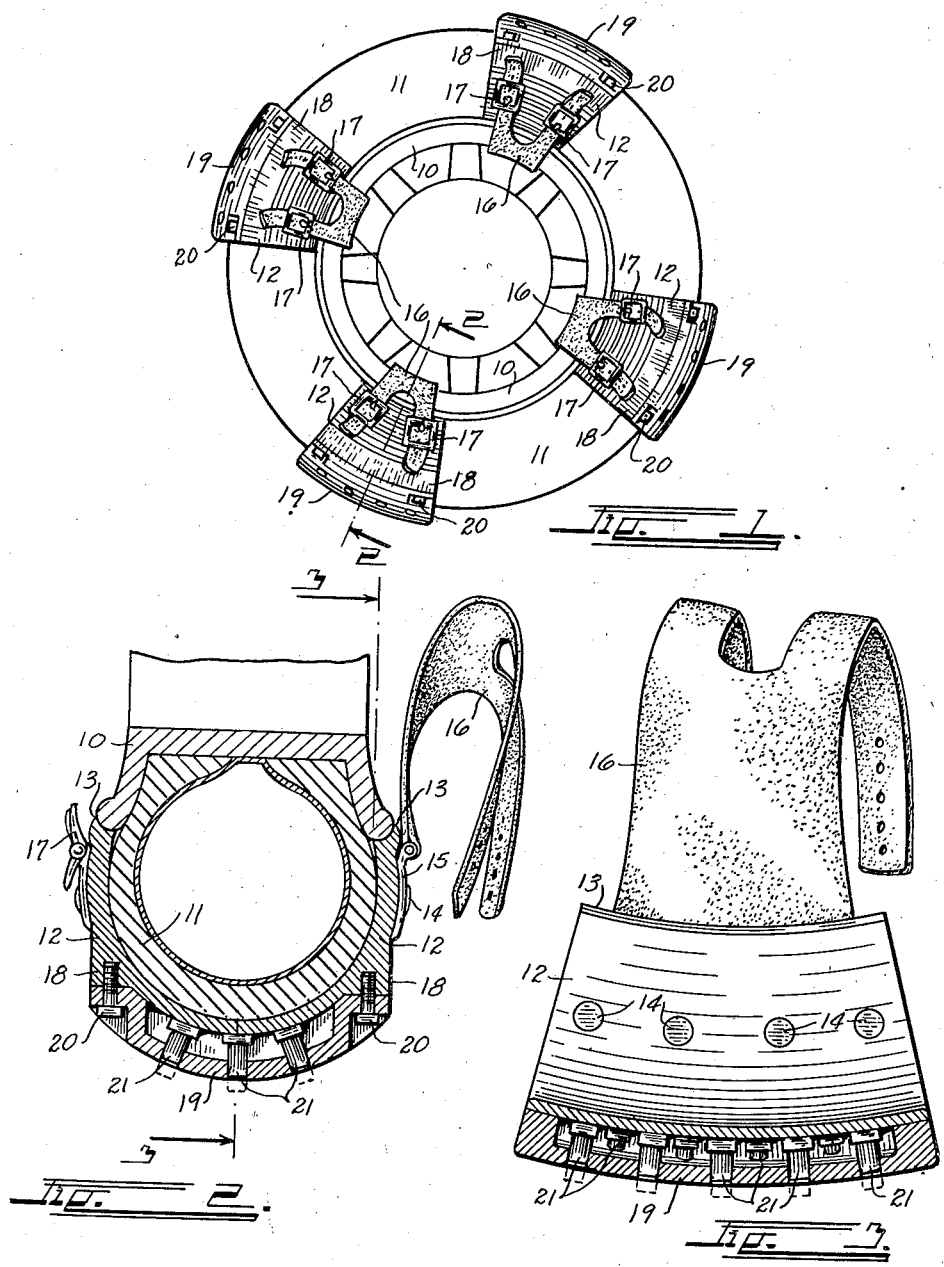
INVENTOR.
WILKS BOOTH GREGG.
BY
ATTORNEY Patented June 10, 1947

2,422,092

UNITED STATES PATENT OFFICE 2,422,092

TRACTION SHOE

Wilks Booth Gregg, Denver, Colo.

Application February 21, 1947, Serial No. 729,973

6 Claims. (Cl. 152—229)

This invention relates to devices for selective association with the tired wheels of automotive vehicles to enhance the tractive grip thereof, and has as an object to provide an improved traction shoe unit conveniently mountable on and removable from conventional automotive wheels.

A further object of the invention is to provide an improved construction and unitary combination of elements constituting an efficient automotive vehicle traction shoe.

A further object of the invention is to provide an improved surface-gripping wear face in an automotive vehicle traction shoe.

A further object of the invention is to provide an improved arrangement of centrifugally-responsive, extensible and retractable grip lugs in association with the wear face of a traction shoe.

A further object of the invention is to provide an improved traction shoe wear face characterized by a grip effect automatically proportioned to the nature and condition of the surface thereby engaged.

A further object of the invention is to provide an improved traction shoe employable to minimize slipping and skidding on, and with a minimum of damage to, paved and analogous hard surfaces.

With the foregoing and other objects in view, my invention consists in the construction, arrangement, and combination of elements hereinafter set forth, pointed out in my claims, and illustrated by the accompanying drawing, in which—

Figure 1 is a side elevation of a conventional, tired automobile wheel as equipped with four of my improved shoes positioned for practical use. Figure 2 is a cross section, on an enlarged scale, taken substantially on the indicated line 2—2 of Figure 1. Figure 3 is a cross section taken on the indicated line 3—3 of Figure 2.

In the construction of the improvement as shown, a conventional automobile wheel of open-spoke type is represented as including the usual rim 10 and pneumatic tire 11 mounted on said rim, said wheel and tire constituting a traction member whereto the improved shoe is applicable, in any desired number of units, for enhanced tractive effect relative to soft or slippery surfaces.

The improved traction shoe unit of the invention includes a body member 12 of rigid material, such as metal, formed to substantially U-shaped cross section in any convenient or desired manner. The body member 12 is transversely and longitudinally contoured, sized and worked to telescope radially over, closely embrace, and fit smoothly against the tread and adjacent side wall portions of the tire 11 throughout the entire body member length, the spaced, free side margins of the member preferably being suitably concaved and worked, as at 13, to engage with and close against arcs of the rim 10 margins when the tire is received and fully seated within the said member. The length of the body member 12 circumferentially of the tire is determined by end planes which preferably converge from the closed outer and toward the open inner side of the member to lie substantially radially of the wheel when the said member is tire-mounted, the separation between said end planes being adjusted at the time of unit manufacture to provide a member having the desired length, conveniently on the order of one-tenth to one-twelfth of the tire 11 circumference. Secured exteriorly to and adjacent a free side margin of one side wall of the body member 12, as by means of rivets 14, a fitting 15 hingedly engages at its edge closest the said member margin with one end of a flexible strap 16, of any suitable size and material, thereby disposed to engage between adjacent wheel spokes to laterally traverse and overlie the inner face of the rim 10, or equivalent wheel element, with its free end or ends overhanging the other wall of the body member in position for engagement with buckles 17 fixedly carried on and exteriorly of said body member wall remote from that equipped with the fitting 15. As is obvious, the strap 16 functions as a convenient means for securing and holding the body member 12 to, and at any selected point circumferentially of, the wheel in embracing relation with the tire 11 section covered thereby, and permits mounting and removal of a given body member relative to the tire while the latter is in normal operating engagement with the ground or other supporting surface.

The exterior surface of the body member 12 portion engageable against the tire tread is smoothly convex, both transversely and longitudinally, to substantially conform with the corresponding tire contours and is laterally limited, at each side of the tire tread, by a shoulder 18 integrally outstanding from the body member side wall to present a longitudinally-arcuate, laterally-flat surface radially inward of the wheel from the body member crown. A cap 19 is formed of wear-resistant, rigid material to present a wear surface substantially parallel to the crown portion of the body member 12 and inner side margin faces engageable against the radially-directed surfaces of the shoulders 18, to which shoulders said cap is removably and replaceably secured, in covering relation with the body member crown, by means of cap screws 20, or the like, engaging through inwardly-relieved, apertured corners of the cap and with threaded seats intersecting said shoulders. The cap 19 is of substantial thickness and is formed with a relatively-extensive, interior recess opening toward and closable by the crown portion of the body member 12 to provide a hollow chamber of uniform depth radially of the wheel and so disposed as to position its principal exterior wall as the tread portion of the assembly. The cap 19 convex portion constituting the exterior wall of the cap recess is intersected by a plurality of like, circular apertures, in any desired specific pattern or arrangement, axially radial thereof, and a headed stud 21, formed with a cylindrical stem portion and of a length slightly less than the overall depth of the cap 19, is end-engaged within and to slide axially through each of said apertures with its headed end within the cap recess and directed to bear against the crown of the body member 12. As so formed and mounted, each of the studs 21 is held against disengagement from its slide aperture, is independently free to reciprocate through its slide aperture between an inner limit determined by engagement of its head against the body member crown and characterized by retraction of the stud outer end inwardly of the cap 19 exterior surface and an outer limit determined by engagement of the stud head with the cap recess-limiting inner surface and characterized by extension of the stud stem outwardly beyond the cap exterior surface, and is free to rotate relative to and within its slide aperture.

The studs 21 constitute the traction-enhancing elements of the improved shoe and hence are preferably of hard, tough material capable of withstanding the impacts and abrasions to which they are subject without deformation or destruction. When a shoe assembly is mounted in operative relation with a vehicle wheel, the centrifugal forces generated as an incident of wheel rotation tend to urge the studs 21 of the assembly outwardly of their slide apertures and to the limit of their stem projections relative to the cap tread surface, in which position the stud stems function as lugs productive of gripping effect in and against soft, slippery surfaces, such as are characteristic of mud and snow, thereby checking the tendency of the wheel to slip and effectively transmitting the wheel tractive influence. When traversing pavements and like hard surfaces, rotation of the shoe-equipped wheel brings the edge or corner margins of the projecting stud 21 stems into biting engagement with the traction surface sufficiently to check non-rolling reaction of the wheel on the surface, and as the wheel advances the said studs are retractively pressed within the interior of the shoe cap and out of such projection beyond the cap surface as would result in damage to the hard surface being traversed.

Since changes in the form, construction, and arrangement of the elements shown and described may be had without departing from the spirit of my invention, I wish to be understood as being limited solely by the scope of the appended claims, rather than by any specific details of the illustrative showing and foregoing description.

I claim as my invention:

1. A traction shoe for removable and replaceable association with a tired automotive vehicle wheel, comprising a rigid body member embracingly engageable over and about an arcuate segment of a wheel-mounted tire, selectively engageable and releaseable means for securing said body member in mounted relation with the tire, a shallow, closed chamber on the tread portion of said member, and a plurality of studs accommodated in said chamber in centrifugally-extensible, pressure-retractable, freely-slidable relation through and radially of said chamber exterior wall.

2. A traction shoe for removable and replaceable association with a tired automotive vehicle wheel, comprising a rigid body member embracingly engageable over and about an arcuate segment of a wheel-mounted tire, spaced, free side margins on said member conformably engageable against periphery portions of the tire-mounting rim, means for securing said body member in mounted relation with the tire and rim, a shallow, closed chamber on the tread portion of said member, and a plurality of studs spacedly accommodated in said chamber in centrifugally-extensible, pressure-retractable, freely-slidable relation through and radially of said chamber exterior wall.

3. A traction shoe for removable and replaceable association with a tired automotive vehicle wheel, comprising a rigid body member having tread and side wall portions conformably engageable over and about an arcuate segment of a wall-mounted tire, selectively engageable and releasable means for securing said body member in embracing relation with the tire, a cap removably covering said member tread portion and cooperating therewith to define a shallow, closed chamber, apertures intersecting the exterior wall of said chamber, and a headed stud stem-engaged in and slidable axially through each of said apertures with its head end accommodated within said chamber.

4. A traction shoe of the character described, comprising a rigid body member including side wall and tread portions conformed to embracingly engage over and about an arcuate segment of a wheel-mounted tire, flexible means fixed adjacent one member side wall margin and selectively engageable with means adjacent the other side wall margin to secure said member in mounted relation with a tire, longitudinally-arcuate shoulders projecting exteriorly from the member side walls inwardly of the tread portion crown, a cap seated on and secured to said shoulders in covering relation with the member tread portion and cooperating therewith to define a shallow, closed chamber, a plurality of like apertures intersecting the cap portion forming the exterior wall of said chamber, a stud stem-engaged in and slidable axially through each of said apertures radially of the cap, and a head on the inner end of each stud within said chamber to limit axial displacement of the associated stud.

5. In a traction shoe of the character described having a rigid body member conformed to embracingly engage over and about an arcuate segment of a wheel-mounted tire and means for selectively securing said member in mounted relation with the tire, a shallow, closed chamber coextensive with and constituting the member tread portion, and a plurality of studs accommodated in said chamber in centrifugally-extensible, pressure-retractable, freely-slidable relation through and radially of said chamber exterior wall.

6. In a traction shoe of the character described having a rigid body member conformed to embracingly engage over and about an arcuate segment of a wheel-mounted tire and means for securing said member in mounted relation with the tire, a laterally and longitudinally crowned tread portion on said member, longitudinally-arcuate shoulders exteriorly projecting from said member as transverse limits of said tread portion, a cap seated on and secured to said shoulder in parallel, bridging relation over said tread portion and cooperating with the latter to define a shallow, closed chamber, a plurality of like apertures intersecting the cap portion forming the exterior wall of said chamber, a cylindrical stud slidably and rotatably engaging through each of said apertures radially of said tread portion, and a head on the end of each said studs within said chamber alternatively engageably with said cap and tread portion to limit axial displacement of the associated stud.

WILKS BOOTH GREGG.